Sept. 17, 1963 J. W. MYERS 3,104,120
COUPLING FOR CONDUITS
Original Filed June 28, 1954

INVENTOR.
JOHN W. MYERS
BY
Attorney 3,104,120
COUPLING FOR CONDUITS
John W. Myers, Balboa Island, Calif., assignor of one-tenth to Brodie Ahlport, Los Angeles, Calif., and June L. Myers, administratrix of said John W. Myers, deceased, assignor of nine-tenths to June L. Myers, Corona del Mar, Calif.
Continuation of application Ser. No. 439,533, June 28, 1954. This application Dec. 1, 1958, Ser. No. 777,321
2 Claims. (Cl. 285—161)

This invention relates generally to pipe joints, and more particularly to means for joining pipes or conduits to sheet metal walls. Illustratively, and in its present primary application, the invention deals specifically with a coupling means for joining an electrical conduit pipe to the wall of a switch box or the like. This application is a continuation of my copending application, entitled, Coupling for Conduits, filed June 28, 1954, Serial No. 439,533.

In the trade, a coupling for joining an electrical conduit to a sheet metal wall of a switch box or the like is known as a "hub." Various forms of hubs have been provided in the past, but none, insofar as I am aware, has met in a simple, inexpensive and satisfactory manner all of the three principal requirements for such hub as are specified in existing electrical codes. These are: (1) low electrical resistance through the coupling, i.e., from the conduit to the electrically grounded switch box, the measurement usually being made from the conduit to ground; (2) that the hub, when installed, be capable of withstanding a specified torque, e.g., 1000 inch pounds for a 1–1½ inch conduit; (3) that the hub be completely weatherproof.

It is accordingly a primary object of the invention to satisfy these three basic requirements in an improved manner, i.e., to provide a hub affording a very low resistance connection to the sheet metal wall to which it is joined, one which tightens readily and easily to a high value of torque, and one which is absolutely fluid-tight when installed.

A further object is to satisfy the above primary purposes in a novel hub which is simple, inexpensive, and capable of being quickly, easily and inexpensively installed.

The invention can most easily be understood by referring now to the following detailed description of certain present illustrative embodiments, reference being had to the accompanying drawings, in which.

Figure 1:
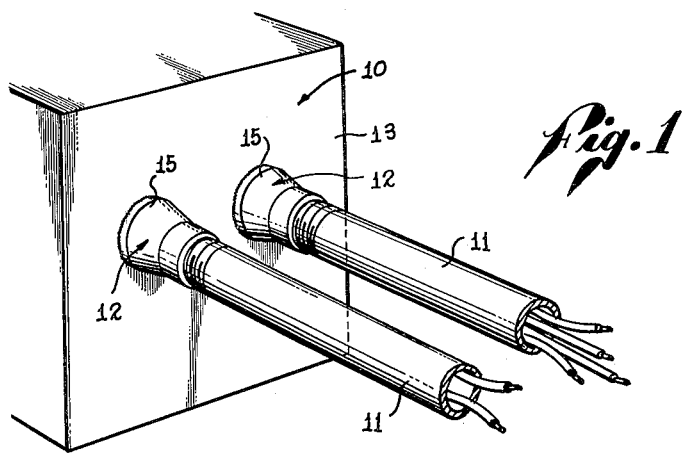
FIG. 1 shows in perspective a sheet metal switch box with a pair of conduits joined thereto by hubs in accordance with the invention.
Figure 2:
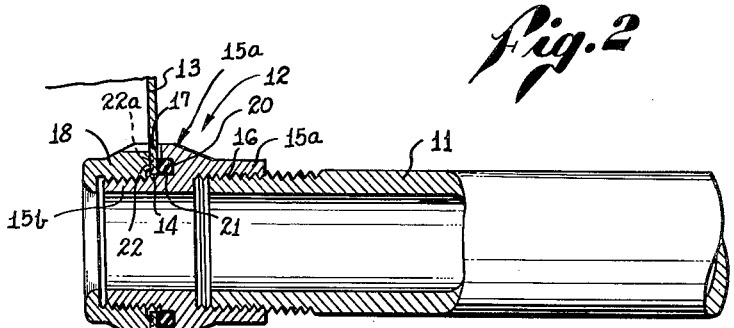
FIG. 2 shows the hub of the invention in vertical longitudinal section, joined to the wall of a switch box.
Figure 3:
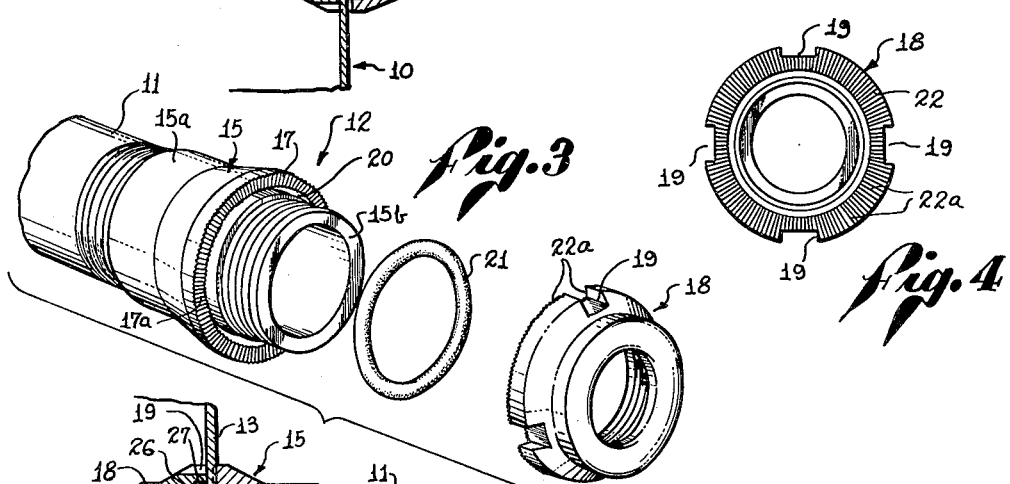
FIG. 3 is an exploded view of the hub.
Figure 4:
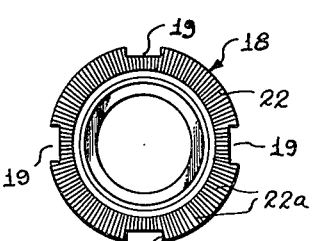
FIG. 4 is the face view of a nut member forming one part of the hub.

In the drawings, numeral 10 designates generally a conventional switch box, such as may be installed in a position exposed to the weather, and at 11 are designated usual electrical conduit pipes joined by hubs 12 to the rear sheet metal wall 13 of box 10.

Wall 13 has a circular aperture 14, formed in the usual way, and an external hub part 15 on conduit 11 is in the form of a collar or annulus having a somewhat reduced rearward tubular part 15a, having internal threads 16 for engagement with the threaded end of conduit 11, the collar having a further reduced tubular externally screw threaded part 15b projecting therefrom and entering aperture 14, as shown. Collar 15 has an annular front face 17 confronting and engaging the exterior face of wall 13. A nut member 18 is screwed onto the tubular member 15b of collar 15 that protrudes through aperture 14 into the interior of the switch box when the face 17 of collar 15 is in engagement with wall 13. The nut 18 is provided with any suitable formations, such as recesses typically indicated at 19, adapting it for engagement by a suitable wrench. As will be seen in the drawings, the tubular part 15b is threaded from its extremity to a distance approximately coplanar with the face 17. An annular groove 20 is sunk into the front of the hub, radially inside annular face 17, and to a depth below the plane of face 17, the inner side wall of said groove being defined by an inner extent of the tubular portion 15b, and the outer side wall thereof extending inwardly into the hub from the inner boundary of the annular face 17. Lodged in this groove 20 is a synthetic rubber sealing ring 21, of the well known O-ring type, and this sealing ring is squeezed between the bottom of groove 20 and the surface of wall 13, as shown. Attention is directed to the fact that the base portion of the tubular member 15b and the inner side wall of the groove 20 are shaped and dimensioned to clear the opposing face of wall 13 around aperture 14, no shoulder or abutment engageable with the wall being permitted in this region which might otherwise, by engagement against wall 13, prevent or limit tight clamping of annular face 17 against wall 13, or biting engagement of later described serrations on face 17 into wall 13. With the nut 18 tightened only with finger pressure, O-ring seal affords complete protection against moisture passing through the joint. It also seals against explosive pressure in event of an explosion taking place to the left of panel 13.

The face 22 of nut 18 facing the inside surface of wall 13, and the face 17 of collar 15, are formed with similar radially extending teeth or serrations, indicated at 22a and 17a, respectively, which teeth or serrations bite into the opposed faces of wall 13 as the nut is tightened on member 15b. I have found that these teeth may be placed on the face 17 of collar 15, in which case they bite into the exterior face of the wall 13 as the conduit is drawn inward owing to tightening of the nut; or they may be placed on the face 22 of the nut, in which case they dig or bite into the inside face of the wall 13 as the nut is tightened; or, as here shown, they may, if desired, be used in both locations. The effect, in either case, is to afford good, low resistance electrical contact between the "hub" and the wall 13, as well as a mechanical connection of high torque value. That is to say, once tightened by means of a wrench applied to the nut, extremely high torque must be applied to the conduit to loosen the connection.

Thus, I have accomplished the objective initially set forth. The biting engagement of the teeth into the surfaces of wall 13 assures a low resistance coupling from the hub to the wall of the switch box. Mechanically, an extremely high torque value has been achieved. The biting engagement of the teeth 17a on the annular hub face 17 into the surfaces of the switch box wall resist effort to turn the hub up to an exceedingly high torque—much beyond the necessities of safety, and well above code requirements. Finally, a highly effective moisture seal is afforded, completely protecting against entrance of moisture even though the box be exposed to the weather. Tests have shown that the hub provided by the present invention meets existing specifications in the respects noted above with a high margin of safety.

In addition, the hub provided by the invention will be seen to be simple and inexpensive in construction, and it will further be seen that it is installed with a minimum of effort and consumption of time. It is merely necessary to thread the collar onto the conduit, insert the seal, introduce the portion 15b of the external hub part 15 through the prepared aperture in the wall of the switch box, and apply the nut. The installation procedure will be seen to be of a most simple character.

Figure 5:
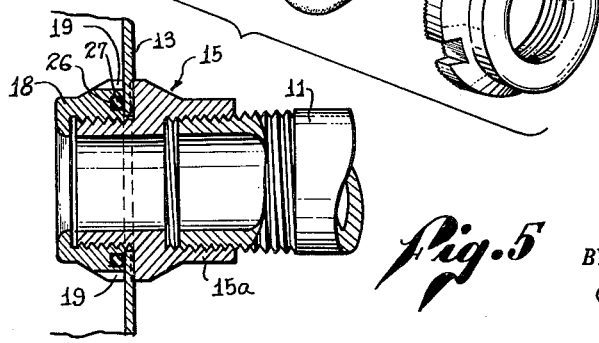
FIG. 5 shows a modfication.

In FIG. 5, I have shown a modification wherein the sealing ring is placed inside the nut rather than accommodated within the collar. Thus, in this case (all other parts remaining as in the first described embodiment, and identified by corresponding reference numerals), an annular groove 26 is formed in the face of the nut 18, and lodged therein is a sealing ring 27, again of the conventional O-ring type. If desired, of course, sealing rings may be placed in both the collar 15 and the nut 18. It is found on test, however, that a single such seal is entirely adequate.

The joint of the invention has been described in the foregoing primarily in its application to electrical conduit connections to sheet metal walls. It will be evident, however, that the joint may be used for other purposes. For example, it might be used to provide a liquid-tight joint of high mechanical security between a tank and an inlet or outlet pipe. Various other applications will suggest themselves to those skilled in the art.

The drawings and description have shown present illustrative embodiments of the invention, and have suggested a certain specific application thereof. It is to be understood, however, that these are for illustrative purposes only, and that various changes in design, structure, and arrangement may be made without departing from the spirit and scope of the appended claims.

I claim:

1. In a device of the character described, the combination of: a hub part integrally formed with a collar portion and tubular portions projecting axially on opposite sides of said collar portion, one of said tubular portions being threaded for coupling to a pipe and the other being externally threaded and adapted to extend through an aperture in a mounting wall, said collar portion having an outer periphery of larger diameter than said externally threaded tubular portion and having an annular wall-engaging clamping face, adapted to engage one side of said mounting wall, disposed in a plane normal to the axis of said hub and extending around, and facing axially in the same direction as, said externally threaded tubular portion, said annular clamping face having teeth adapted to make biting engagement with the opposed face of said mounting wall, said collar portion having an annular groove for an O-ring seal extending inwardly thereinto from the plane of said clamping face, said groove having inner and outer side walls, said outer side wall being defined by a surface spaced radially inwardly from the outer periphery of said collar portion and forming the inner boundary of said clamping face and said inner side wall being defined by a surface which joins said threaded tubular member at the base of the latter, said last-mentioned surface and said threaded tubular member being shaped and dimensioned to clear the opposing surface of said apertured wall whereby to permit unrestricted engagement of said teeth on said annular clamping face with the surface of said mounting wall; and a clamping nut threaded on said externally threaded tubular portion having a clamping face opposed to said clamping face on said collar portion and adapted to engage the other side of said mounting wall.

2. In a device of the character described, the combination of: a hub part integrally formed with a collar portion and tubular portions projecting axially on opposite sides of said collar portion, one of said tubular portions being threaded for coupling to a pipe and the other being externally threaded and adapted to extend through an aperture in a mounting wall, said collar portion having an outer periphery of larger diameter than said externally threaded tubular portion and having an annular wall-engaging clamping face, adapted to engage one side of said mounting wall, disposed in a plane normal to the axis of said hub and extending around, and facing axially in the same direction as, said externally threaded tubular portion, said collar portion having an annular groove for an O-ring seal extending inwardly thereinto from the plane of said clamping face, said groove having inner and outer side walls, said outer side wall being defined by a surface spaced radially inwardly from the outer periphery of said collar portion and forming the inner boundary of said clamping face and said inner side wall being defined by a surface which joins said threaded tubular member at the base of the latter, said last-mentioned surface and said threaded tubular member being shaped and dimensioned to clear the opposing surface of said apertured wall whereby to permit unrestricted engagement of said annular clamping face with the surface of said mounting wall; and a clamping nut threaded on said externally threaded tubular portion having a clamping face opposed to said clamping face on said collar portion and adapted to engage the other side of said mounting wall, at least one of said clamping faces having teeth adapted to make biting engagement with said mounting wall.

References Cited in the file of this patent

UNITED STATES PATENTS

| | | |
|---|---|---|
| 1,833,462 | Hagist | Nov. 24, 1931 |
| 2,055,130 | Hotchkin | Sept. 22, 1936 |
| 2,147,254 | Hinderliter | Feb. 14, 1939 |
| 2,343,235 | Bashark | Feb. 29, 1944 |
| 2,452,184 | Cole | Oct. 26, 1948 |
| 2,462,023 | Johanson | Feb. 15, 1949 |
| 2,523,585 | Mueller | Sept. 26, 1950 |
| 2,554,456 | Coleman | May 22, 1951 |
| 2,676,037 | Mueller | Apr. 20, 1954 |
| 2,701,871 | Rauch | Feb. 8, 1955 |